March 1, 1949.  H. TREVASKIS  2,463,069
AIRCRAFT BRAKE SYSTEM
Filed March 5, 1946
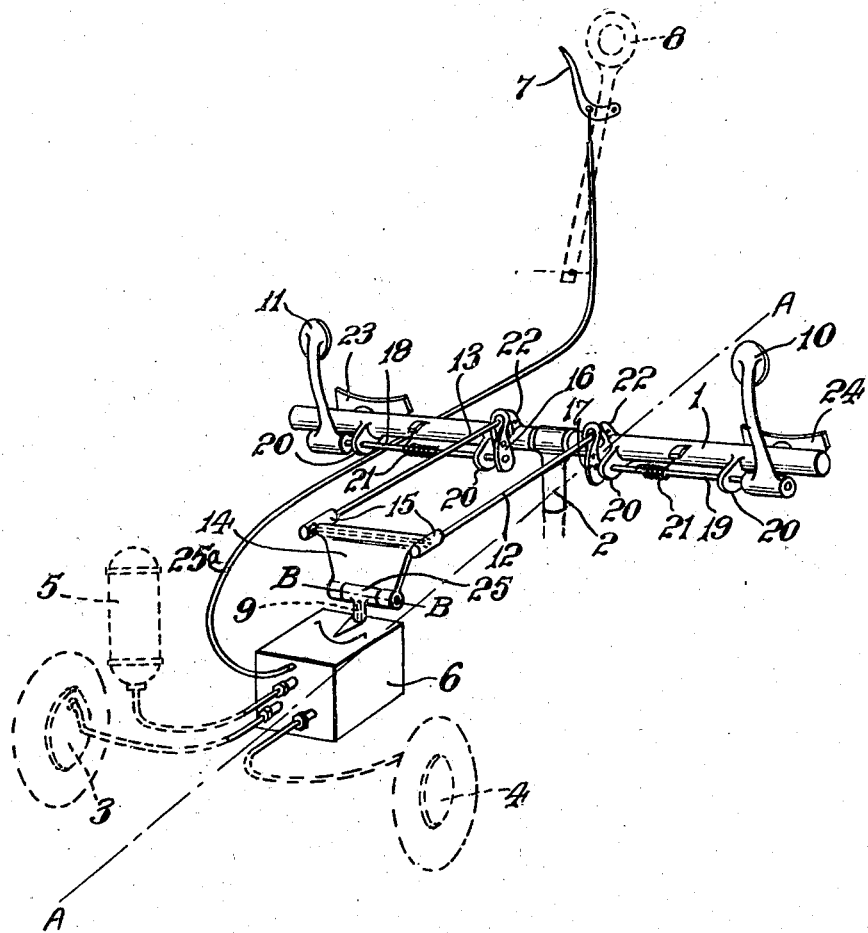
Inventor
Henry Trevaskis
by Benj. T. Rauber
his attorney Patented Mar. 1, 1949

2,463,069

UNITED STATES PATENT OFFICE 2,463,069

AIRCRAFT BRAKE SYSTEM

Henry Trevaskis, Solihull, Birmingham, England, assignor to Dunlop Rubber Company Limited, London, England, a British company Application March 5, 1946, Serial No. 652,127
In Great Britain March 13, 1945

7 Claims. (Cl. 244—111)

1

My invention relates to improvements in or concerning aircraft brake systems in which at least one wheel brake unit is disposed on either side of the centre line of the aircraft, said wheel brake units being each connected to one of a pair of valves operable by one hand control to admit fluid at equal pressure to said wheel brake units from a source of fluid under pressure.

Such systems are commonly associated with steering means such as a pivoted rudder-bar movable by the feet of the pilot to deflect an air rudder, such movement of the rudder-bar not only deflecting the air-rudder but also being utilised differentially to actuate the valves to increase the pressure of the fluid admitted to the wheel brake unit on the side of the aircraft to which the turn is being made and to reduce the brake pressure on the brake unit of the other wheel which traces the outer track of the turn.

Movement of the rudder-bar for steering the aircraft on the ground may be found impracticable however, either because the air pressure against the air rudders in large aircraft make an excessive demand on the pilot's physical strength, or because the prevention of rudder flutter necessitates the locking of the air-rudder and rudder-bar, either circumstance preventing rudder-bar movement being utilised for ground steering by differential actuation of the reducing valves through their normal connections to the rudder-bar.

The invention has for its object to provide a braking system for aircraft particularly aircraft of heavy type, in which ground steering is facilitated and rendered independent of the movement of the air-rudder by its rudder-bar.

According to this invention we provide brake control for an aircraft having a pair of valves differentially operable by a pivoted rudder-bar to admit fluid to wheel brake units from a source of fluid under pressure for the purpose of steering the said aircraft wherein auxiliary means operate the said valves independently of the movement of said rudder-bar.

The invention also comprises a braking system to control the steering of aircraft which includes brake units for the wheels on opposite sides of the said aircraft, valves to admit fluid at differential pressure to the said brake units from a source of fluid under pressure, a swash plate to operate said valves, a rudder-bar movable about a central pivot connected to said swash plate, and auxiliary means attached to said rudder-bar for operating said swash plate independently of the movement of the said rudder-bar.

2

In order that the invention may be more readily understood and carried into effect the same will now be described with reference to the accompanying drawing depicting a perspective view of an aircraft brake control system constructed to operate in accordance with the invention.

As shown in the drawing the improved aircraft brake control system comprises a rudder-bar 1 movable about a central pivot 2, and wheel brake units 3 and 4 disposed for steering purposes on opposite sides of the centre line A—A of the aircraft. The wheel brake units are supplied with fluid under pressure from an air bottle 5 or like source of fluid under pressure through valves contained in a housing 6, the valves being capable of actuation in known manner to release fluid at equal pressure to both of the wheel brake units under the control of a hand lever 7 which may be attached to the principal flying control 8, or to release fluid at different pressures to the wheel brake units when actuated by the angular movement about its axis of a spindle 9 which projects from the valve housing 6.

Differential valve apparatus suitable for use in the invention is described for example in British Patent No. 507,162, and each wheel brake unit may be of the type including brake shoes movable into contact with the brake drum of a wheel by the action of distensible means interposed between the brake shoes and a channelled annulus secured to the wheel support.

In the improved braking system the rudder-bar 1 is provided with auxiliary means to operate the said valves independently of angular movement of the rudder-bar or concurrently with such movement. The said auxiliary means include two pedals 10 and 11 spaced apart each adjacent one of two heel-rests 23 and 24 at opposite ends of the rudder-bar, and also includes two connecting rods 12 and 13 movable lengthwise by angular movement of either pedal to effect differential actuation of the valves by ball jointed articulation to the extremities of a swash-plate 14 secured to the spindle 9 which projects from the valve housing 6.

The swash-plate 14 is hinged to the spindle 9 by a tabular T shaped member 25 about an axis B—B which passes through, and is disposed at right angles to the axis of the spindle 9. The connections 12 and 13 are attached to the upper extremities of the swash-plate on opposite sides thereof by ball joints which are contained in sleeves 15 and permit the requisite freedom of movement to the ends of the connections. The other ends of the connections are each connected by a ball joint to one of two cranks 16 and 17 each of which is secured on opposite sides of the rudder-bar pivot 2 to one of two shafts 18 and 19. The shafts 18 and 19 extend parallel to the rudder-bar each being movable angularly about its axis in bearings 20 formed on the rudder-bar, one of the pedals 11 and 12 being secured to each of the shafts for angular movement in a plane at right angles to the axis of the rudder-bar.

Each shaft is spring-loaded by a torsion spring 21 serving to return its crank against one of a pair of stops 22 carried by the rudder-bar and to restore the pedals to the position shown.

The operation of the system is as follows. On moving the hand control 7 the movement of the lever is transmitted to the valves in the casing by the cable 25a in known manner to effect release of fluid to both wheel brake units 3 and 4 at equal pressure. Should the pilot now depress both pedals 10 and 11 equally the swash-plate 14 is merely deflected about its axis B—B which is at right angles to the spindle 9 without causing partial rotation of the spindle, such angular movement of the swash-plate consequently having no effect on the pressure transmitted to the wheel brake units.

If the pilot wishes to alter course to either side he may either push forward the rudder-bar 1 on that side towards which he wishes to steer, or if precluded from doing so in the event of the rudder-bar being locked against rudder flutter or immovable due to other causes, he may still obtain a differential braking action by depressing that pedal on the side towards which he wishes to turn, independently of the rudder-bar. The movement of either pedal causes angular movement of the swash-plate 14 in opposite directions about the axis of the spindle 9 which is secured to the swash-plate thus effecting differential actuation of the valves in the housing 6 with differential application of the brakes.

Having described my invention, what I claim is:

1. Brake apparatus for aircraft which comprises brake units on opposite sides of said aircraft, valves to admit fluid at different pressures to said brake units from a source of pressure fluid, a proportioning element pivoted on a vertical axis to operate said valves differentially and pivoted on a horizontal axis, a rudder bar pivoted on a central pivot, means connecting said proportioning element on opposite sides of said vertical axis and spaced from the same side of said horizontal axis, said connecting means comprising elements movable independently of said rudder bar to actuate said proportioning element independently of the position of said rudder bar.

2. The brake apparatus of claim 1 in which said connecting means is connected to said proportioning element by universal connections to permit said proportioning element to tilt on said horizontal axis and rotate on said vertical axis.

3. The apparatus of claim 1 in which said independent means comprises a pair of crank shafts on said rudder bar on opposite sides of its pivotal axis and having a fixed stop relative to said rudder bar, connecting links from the cranks of said crank shaft to said proportioning element and pedals to operate said crank shafts independently to move said links independently of the position of said rudder bar.

4. Control means for aircraft brake control valves which comprises a rotatable valve control shaft, a rocking means pivoted on an axis of rotation at a right angle to the axis of rotation of said shaft, a rudder-bar rotatable about an axis parallel to that of said valve control shaft, independently actuated means on said rudder-bar on opposite sides of its axis of rotation and connections, one from each of said actuated means to said rocking means at points on said rocking means equally spaced from its axis of rotation on said shaft and on opposite sides of the axis of rotation of said valve control shaft.

5. Control means for aircraft brake control valves which comprises a rotatable valve control shaft, a rocking means pivoted on said shaft at an axis of rotation at a right angle to the axis of rotation of said valve control shaft, a rudder-bar pivoted to rotate on an axis parallel to that of said valve control shaft, independently actuated cranks on said rudder-bar on opposite sides of its pivotal axis, a stop for each said crank and a connection from each crank to said rocking means, said connecting means being connected to said rocking means at points spaced from the axis of rotation of said rocking means on said valve control shaft and at opposite sides of the axis of rotation of said valve control shaft.

6. The control means of claim 4 in which said connecting means have universal connections to said rocking means and to said actuating means.

7. The control means of claim 4 in which said rocking means is a plate pivoted at its lower edge on said valve control shaft.

HENRY TREVASKIS.

REFERENCES CITED

The following references are of record in the file of this patent:

UNITED STATES PATENTS

| Number | Name | Date |
|---|---|---|
| 1,782,524 | Weaver | Nov. 25, 1930 |
| 1,971,608 | Hall | Aug. 28, 1934 |
| 2,031,412 | Goodyear | Feb. 18, 1936 |
| 2,038,898 | Goodyear | Apr. 28, 1936 |

FOREIGN PATENTS

| Number | Country | Date |
|---|---|---|
| 852,599 | France | Oct. 30, 1939 |